United States Patent
Vasilantone

[11] 4,116,223
[45] Sep. 26, 1978

[54] SOLAR ENERGY UNIT

[76] Inventor: Michael Vasilantone, 34 Columbia Rd., Somerville, N.J. 08876

[21] Appl. No.: 760,316

[22] Filed: Jan. 18, 1977

[51] Int. Cl.$^2$ .................................................. F24J 3/02
[52] U.S. Cl. ........................................ 126/271; 350/211
[58] Field of Search ................. 126/270, 271; 350/211

[56] References Cited

U.S. PATENT DOCUMENTS

| | | | |
|---|---|---|---|
| 1,951,403 | 3/1934 | Goddard | 126/271 |
| 1,993,213 | 3/1935 | Gill | 126/271 |
| 3,295,591 | 1/1967 | Thomason | 126/400 |
| 3,901,036 | 8/1975 | Martin | 126/270 |
| 3,902,794 | 9/1975 | Abrams | 126/270 |
| 3,970,070 | 7/1976 | Meyer et al. | 126/271 |
| 4,069,812 | 1/1978 | O'Neill | 126/270 |

*Primary Examiner*—Carroll B. Dority, Jr.
*Attorney, Agent, or Firm*—Edward E. Dyson; John J. Byrne

[57] ABSTRACT

A solar energy unit comprising a housing adapted to be mounted on the roof of a building or otherwise suitably supported. The housing has a central cavity which contains a reservoir for a heat absorbing liquid. A heat exchanger containing a circulating heat exchange fluid is immersed in the heat-absorbing liquid. The heat exchange fluid circulates to areas to be heated. A transparent dome covers the upper end of the housing and the cavity and is provided with prismatic facets on its inner surface to magnify the sun's rays and to focus or concentrate the rays on the heat-absorbing liquid. The dome is substantially hemispherical and will receive the sun's rays regardless of the position of the sun relative to the housing.

8 Claims, 3 Drawing Figures

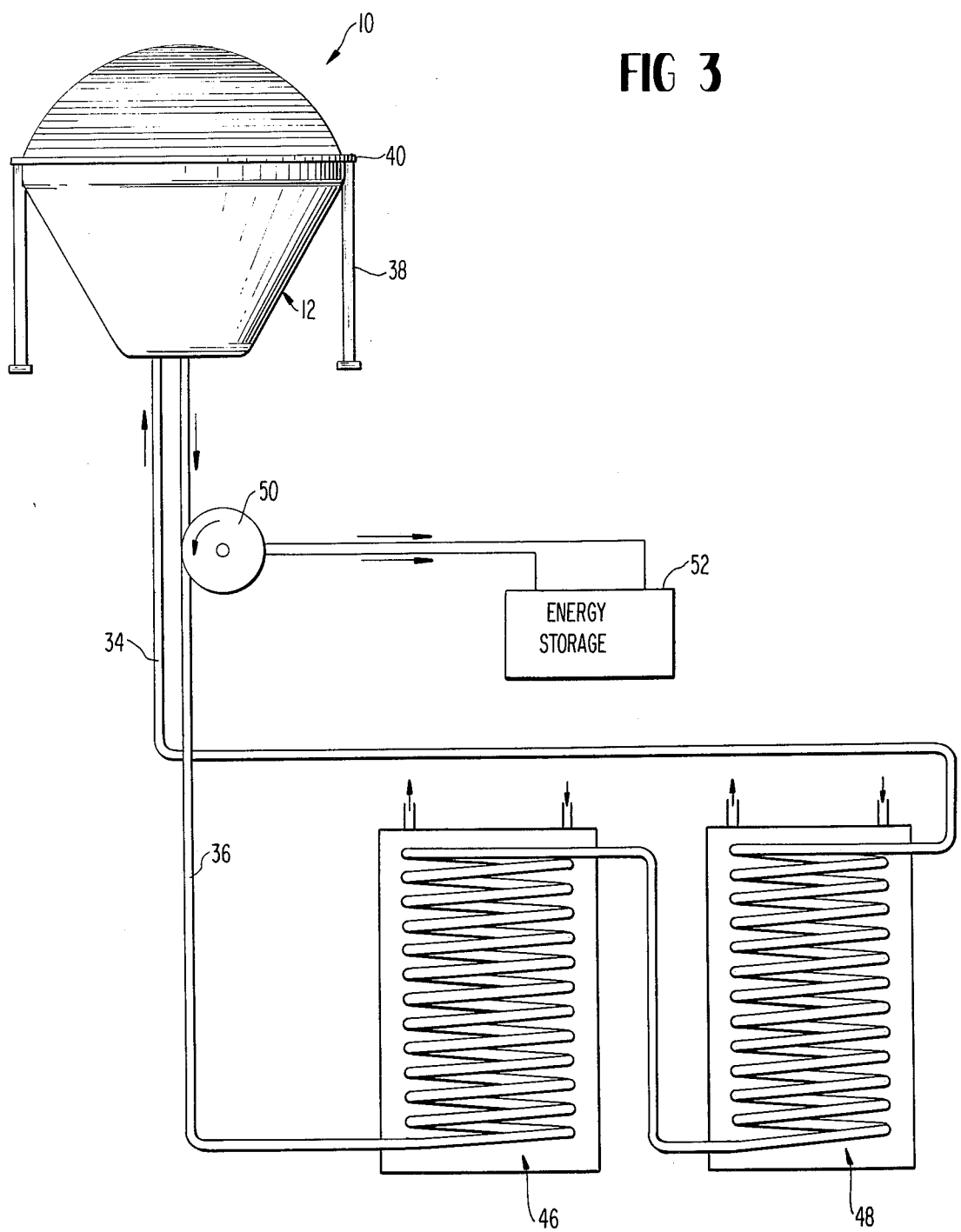

SOLAR ENERGY UNIT

This invention relates to a solar energy unit and more particularly to a solar energy unit having a transparent dome which magnifies and centralizes the sun's rays and is effective for the various positions of the sun.

BACKGROUND AND FIELD OF THE INVENTION

Since the advent of the so-called "energy crisis" which was created by the scarcity of domestically produced oil and natural gas, there has been a significant effort made to develop other sources of energy. For many years, there has been interest in developing systems for harnessing solar energy; but this interest has increased substantially in the last two or three years resulting in the development of a myriad of systems both experimental and practicable for utilizing the sun's energy.

This invention is directed primarily toward the collector portion of a solar energy unit which receives the sun's rays and directs it to elements to be heated. For the most part, prior art devices utilize planar collector surfaces which are usually slanted in the direction of the sun.

Solar energy systems have been devised for a number of different uses and applications. However, the greatest interest appears to be in supplying energy for heating and/or cooling buildings and more particularly, residences. In any event, and regardless to what particular use the system is put, the collector surface must be mounted for maximum exposure to the sun.

As mentioned above, in most prior art units, the collector surfaces are planar and are slanted toward the sun. Accordingly, they operate at maximum efficiency only when pointed directly at the sun. Therefore, as the sun moves throughout the day, the collector becomes less efficient in collecting the sun's rays.

One of the primary purposes of this invention is to provide a solar energy unit which utilizes a collector which operates at maximum efficiency regardless of the sun's position throughout the day. In general, the invention includes a convex transparent dome which is provided with prismatic facets or lens which magnify and concentrate the sun's rays for any position of the sun about the perimeter of the dome in the horizontal plane. The closest prior art known to the applicant is U.S. Pat. No. 3,125,091 to Sleeper issued Mar. 17, 1964, entitled Inflatable Solar Energy Collector. The Sleeper patent is designed primarily for use as an emergency inflatable energy source as opposed to a stationary system for use in heating buildings or the like. The Sleeper system differs further from the invention of this application in areas that will become apparent from the description to follow.

SUMMARY OF THE INVENTION

The solar energy unit of this invention comprises the housing having a central cavity in which is located a reservoir containing a black, heat-absorbing fluid. The housing is adapted to be mounted on a roof of a building or on any other suitable support which will provide a maximum exposure to the sun. It is contemplated that a unit could be used on a ship or actually adapted for flotation itself. A heat-transfer coil is immersed in the heat-absorbing liquid and contains a second heat-absorbing or heat-transfer fluid. The second fluid is circulated through the facility on which the solar energy unit is mounted to provide a heat source for furnaces, air conditioners and the like. A transparent convex dome covers the top of the housing and the reservoir and is provided with prismatic facets or lens on its undersurface which serve to magnify and concentrate the sun's rays on the centrally located reservoir and the heat-absorbing liquid contained therein. Because of its convex configuration and because of the prismatic facets and lens, the sun's rays will be directed centrally toward the heat-absorbing fluid regardless of the position of the sun relative to the unit. To further assist in heating the heat-absorbing fluid, a floatable metallic grid or the like is placed in a reservoir and floats at the top of the liquid therein and is heated by the sun's rays to further assist in heating the liquid. The heat from the liquid, of course, is transferred through the coil to the second heat-transfer fluid. The second heat-transfer fluid, when heated, tends to expand and flow upwardly through the coil and then when it reaches the top flows downwardly through an outlet conduit and the motion thereof may be used to power a generator for electrical energy storage purposes.

It is an objective of this invention to provide a solar energy unit which has a large solar energy collecting surface in the form of a convex, transparent dome which can be exposed to the sun at any relative position of the sun.

It is a further objective of this invention to provide a solar energy unit which may be adapted to any existing building or the like.

It is another objective of this invention to provide a solar energy unit in which the heated fluid can be used to provide mechanical energy to drive a generator which in turn supplies electricity to a storage unit.

It is a further objective of this invention to provide a compact solar energy unit which may be readily and inexpensively manufactured.

These and other objects of the invention will become more apparent to those skilled in the art by reference to the following detailed description when viewed in light of the accompanying drawings wherein:

BRIEF DESCRIPTION OF THE DRAWINGS

FIG. 3 is a diagrammatic illustration of the solar energy unit of this invention in use in a solar energy system.

DETAILED DESCRIPTION OF THE DRAWINGS

Figure 1:
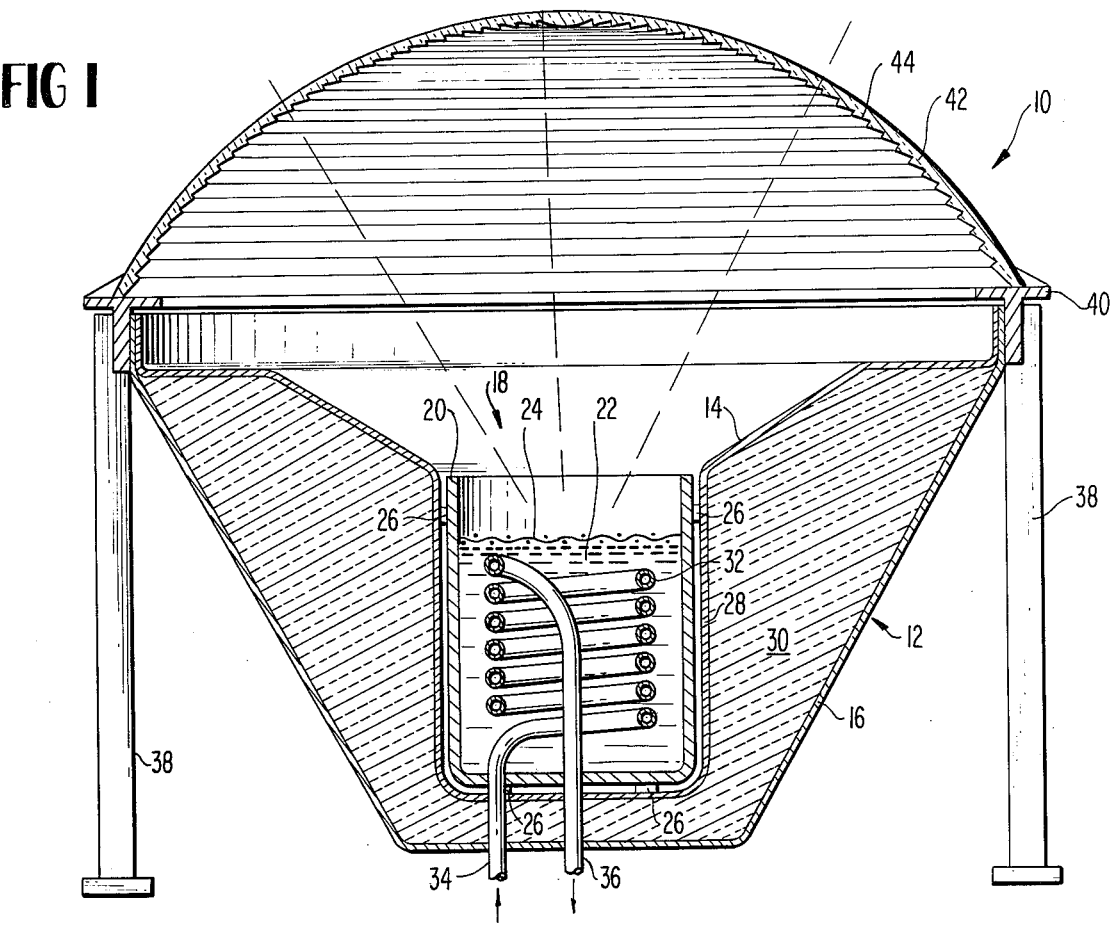
FIG. 1 is a cross sectional view of the solar energy unit of this invention taken along lines 1—1 of FIG. 2.
Figure 2:
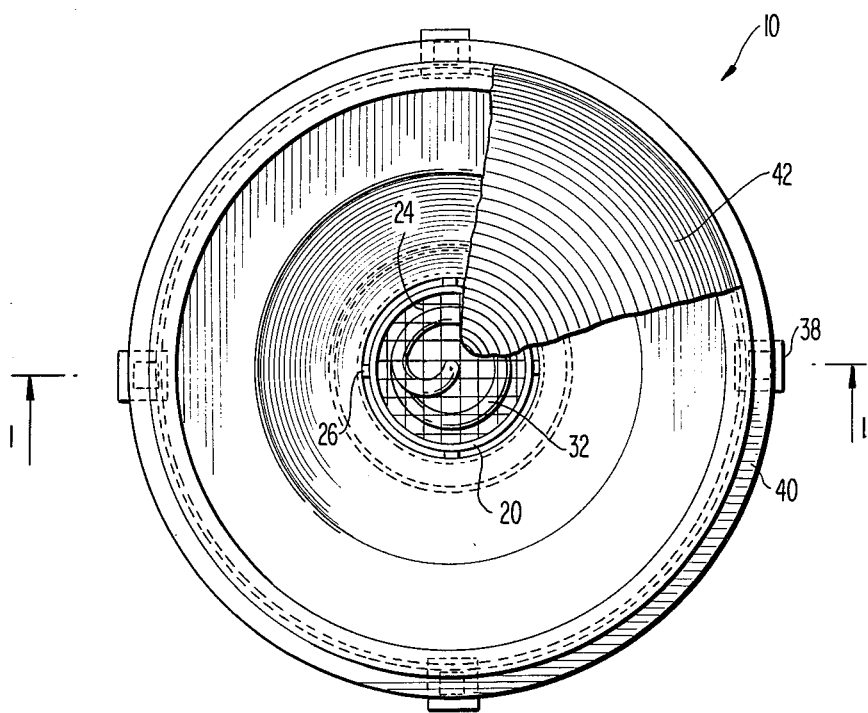
FIG. 2 is a top plan view of the solar energy unit of this invention.

Referring now to the drawings wherein like numerals indicate like parts, the solar energy unit of this invention is generally indicated by the numeral 10 and includes a housing 12 which has an inner wall 14 and an outer wall 16. The inner wall is formed to define a central cavity generally indicated by the numeral 18 which contains a reservoir or container 20. The container can be made of any suitable heat-resistant material. The reservoir is filled with a black, heat-absorbing liquid 22 and contains a floating metallic heat-absorbing screen or grid 24. The reservoir is positioned in the cavity 18 and is spaced from the inner wall 14 by means of spacers 26 suitably spaced around the reservoir 20. The space between the inner wall 14 and the reservoir 20 serves as an insulating barrier. Further, insulation material 30 such as fibreglass or the like is provided in the space between the inner and the outer walls 14 and 16. A coil 32 containing a heat-transfer fluid is immersed in the black liquid 22 and is provided with inlet and outlet conduits 34 and 36.

The housing is supported on any suitable structure such as a roof or the like by means of standards 38. Supporting ring 40 is attached to the upper ends of the standards and receives a convex transparent dome 42 which has on its inner surface a plurality of concentric prismatic facets or lens 44.

The purpose of the dome is to receive the sun's rays from any location about the horizontal perimeter of the dome. The facets or lens 44 will tend to magnify or direct the sun's rays toward the center of the housing such that they are concentrated directly on the grid 24 and the heat-absorbing liquid 22. The heated black liquid transfers its heat through the coils 32 to the heat transfer fluid contained therein; whereupon the heated fluid is transmitted throughout conduit 36 for suitable use within the building.

With reference to FIG. 3, the heated fluid can be transmitted through conduit 36 to coils located in heat storage and transfer units 46 and 48 which may be used to supply heat for the structure and for any other use. As the fluid is heated in the coil 32, it tends to expand and rise upwardly through the coil until it begins to move downwardly through the outlet conduit 36. This movement of the fluid may be used to drive an electricity generator 50 which supplies its energy to an energy storage battery 52 or the like.

The solar energy unit of this invention constitutes an improvement over the prior art by the provision of a dome which magnifies and concentrates the sun's rays more efficiently regardless of the relative position of the sun during its course of travel through the sky during the day.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

I claim:

1. A solar energy unit comprising a housing having a central cavity, a transparent dome on said housing covering said cavity, a reservoir in said cavity, a heat-absorbing liquid in said reservoir, a floating metal grid in said reservoir, heat exchange means in said reservoir immersed in said liquid and containing a heat exchange fluid, passageway means communicating said heat exchange means to a heat storage means, and means on said dome for magnifying and concentrating solar rays on said reservoir.

2. The solar energy unit of claim 1 wherein said means for concentrating and magnifying said rays comprises prismatic concentric facets on the underside of said dome.

3. The solar energy unit of claim 1 wherein said heat-absorbing liquid is opaque.

4. A solar energy unit comprising:
   (a) a housing having a central cavity;
   (b) a reservoir in said cavity;
   (c) a heat-absorbing liquid in said reservoir;
   (d) a heat exchange means in said reservoir immersed in said liquid and containing a heat exchange fluid;
   (e) passageway means communicating said heat exchange means to a heat storage means; and
   (f) a transparent dome on said housing covering said cavity, said transparent dome having prismatic, concentric facets on the underside thereof, whereby solar rays are magnified and concentrated on said reservoir.

5. The solar energy unit of claim 4 and including a floating metal grid in said reservoir.

6. The solar energy unit of claim 4 wherein said heat-absorbing liquid is opaque.

7. The solar energy unit of claim 4 and further comprising an insulating barrier between said reservoir and said housing.

8. The solar energy unit of claim 4 and further comprising insulation material contained in said housing.

* * * * *